United States Patent
Khoryaev et al.

(10) Patent No.: US 9,699,731 B2
(45) Date of Patent: Jul. 4, 2017

(54) INTER-NODE INTERFERENCE CANCELLATION

(75) Inventors: Alexey Khoryaev, Nizhny Novgorod (RU); Andrey Chervyakov, Nizhny Novgorod (RU); Mikhail Shilov, Nizhny Novgorod (RU); Sergey Panteleev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 13/997,230

(22) PCT Filed: May 14, 2012

(86) PCT No.: PCT/US2012/037757
§ 371 (c)(1),
(2), (4) Date: Sep. 23, 2013

(87) PCT Pub. No.: WO2013/048582
PCT Pub. Date: Apr. 4, 2013

(65) Prior Publication Data
US 2014/0018090 A1   Jan. 16, 2014

Related U.S. Application Data

(60) Provisional application No. 61/542,086, filed on Sep. 30, 2011.

(51) Int. Cl.
*H04W 52/02* (2009.01)
*H04W 52/04* (2009.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
CPC ............. H04W 52/04; H04W 54/0222; H04W 52/46; H04W 72/005; H04L 5/0032; H04B 7/024
(Continued)

(56) References Cited

U.S. PATENT DOCUMENTS

| 8,855,040 | B1 * | 10/2014 | Gossett | ................ | H04J 11/0023 370/315 |
| 2004/0116122 | A1 * | 6/2004 | Zeira | .................. | H04B 1/71075 455/445 |

(Continued)

FOREIGN PATENT DOCUMENTS

| CN | 1980090 A | 6/2007 |
| CN | 100592663 C | * 2/2010 |

(Continued)

OTHER PUBLICATIONS

International Search Report and Written Opinion received for PCT application No. PCT/US2012/037757, mailed on Jul. 31, 2012, 10 pages.

(Continued)

Primary Examiner — Marisol Figueroa
(74) Attorney, Agent, or Firm — Thorpe North & Western

(57) ABSTRACT

A method for cancelling inter-node interference at a victim node is disclosed, which method may be executed as instructions on a machine, where the instructions are included on at least one computer readable medium. The method can include the victim node receiving downlink signal information from an aggressor node. The victim node can estimate a channel impulse response for a channel between the aggressor node and the victim node using the downlink signal information. The victim node can estimate an inter-node interference signal for the channel using the downlink signal information and the channel impulse response. The victim node can receive an uplink signal from a wireless (Continued)

device, wherein the downlink signal information is received prior to the reception of the uplink signal. The victim node can subtract the estimated inter-node interference signal from the uplink signal to form an inter-node interference compensated uplink signal to substantially cancel the inter-node interference from the aggressor node in the uplink signal.

16 Claims, 8 Drawing Sheets

(51) Int. Cl.
| | |
|---|---|
| H04W 52/46 | (2009.01) |
| H04W 72/00 | (2009.01) |
| H04W 48/16 | (2009.01) |
| H04B 7/06 | (2006.01) |
| H04B 7/0456 | (2017.01) |
| H04L 12/891 | (2013.01) |
| H04L 5/00 | (2006.01) |
| H04W 72/04 | (2009.01) |
| H04W 4/08 | (2009.01) |
| H04W 36/00 | (2009.01) |
| H04W 28/04 | (2009.01) |
| H04W 4/06 | (2009.01) |
| H04W 72/12 | (2009.01) |
| H04W 76/04 | (2009.01) |
| H04L 12/709 | (2013.01) |
| H04W 48/18 | (2009.01) |
| H04W 72/08 | (2009.01) |
| H04W 76/06 | (2009.01) |
| H04B 7/024 | (2017.01) |
| H04B 7/0417 | (2017.01) |
| H04W 52/14 | (2009.01) |
| H04W 84/04 | (2009.01) |
| H04W 52/54 | (2009.01) |
| H04L 12/18 | (2006.01) |
| H04L 25/02 | (2006.01) |
| H04W 28/10 | (2009.01) |
| H04W 52/24 | (2009.01) |
| H04W 52/36 | (2009.01) |
| H04W 48/12 | (2009.01) |

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01); *H04W 36/0005* (2013.01); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/048* (2013.01); *H04W 76/064* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02B 60/50* (2013.01)

(58) Field of Classification Search
USPC ...................................... 455/452.1
See application file for complete search history.

(56) References Cited

U.S. PATENT DOCUMENTS

| | | | |
|---|---|---|---|
| 2007/0206688 A1* | 9/2007 | Munzner | H04B 1/7097 375/260 |
| 2010/0009705 A1 | 1/2010 | Budianu et al. | |
| 2010/0061496 A1 | 3/2010 | Black et al. | |
| 2010/0107028 A1 | 4/2010 | Gorokhov et al. | |
| 2010/0120367 A1 | 5/2010 | Nanda et al. | |
| 2013/0094387 A1* | 4/2013 | Susitaival | H04W 72/085 370/252 |
| 2013/0155917 A1* | 6/2013 | Hu | H04W 16/10 370/280 |

FOREIGN PATENT DOCUMENTS

| | | | | |
|---|---|---|---|---|
| CN | 102025411 A | * | 4/2011 | ........ H04L 1/0083 |
| CN | 102065031 A | | 5/2011 | |
| CN | 102065490 A | | 5/2011 | |
| CN | 102090014 A | | 6/2011 | |
| WO | WO 2011/115703 A1 | | 9/2011 | |
| WO | 2013/048582 A1 | | 4/2013 | |

OTHER PUBLICATIONS

3GPP TR 36.828, "Evolved Universal Terrestrial Radio Access (E-UTRA), Further Enhancements to LTE Time Division Duplex (TDD) for Downlink-Uplink (DL-UL) Interference Management and Traffic Adaptation", Jun. 2012, pp. 109, V11.0.0, Release 11, Valbonne, France.
Intel, "Interference Environment and DL-UL Traffic Asymmetry in LTE-TDD Systems", 3GPP TSG-RAN WG1 R1-112229, Aug. 2011, pp. 5, Meeting 66, Agenda 6.8.1, Athens, Greece.
Li et al, "Dynamic TDD and Fixed Cellular Networks", IEEE Communications Letters, Jul. 2000, pp. 3, vol. 4, No. 7.
Office Action for Chinese application 201280059134X dated Jan. 21, 2015, 23 pages including English translation.
Office Action for Chinese application 201280059134X dated Oct. 9, 2015, 9 pages including English translation.
Search Report for European application 12835851.2 dated Sep. 23, 2015, 6 pages.

* cited by examiner

INTER-NODE INTERFERENCE CANCELLATION

RELATED APPLICATIONS

This application claims the benefit of and hereby incorporates by reference U.S. Provisional Patent Application Ser. No. 61/542,086, filed Sep. 30, 2011.

BACKGROUND

Wireless mobile communication technology uses various standards and protocols to transmit data between a transmission station and a wireless mobile device. Some wireless devices communicate using orthogonal frequency-division multiplexing (OFDM) in a downlink (DL) transmission and single carrier frequency division multiplexing access (SC-FDMA) in an uplink (UL) transmission. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). The downlink transmission can be a communication from the transmission station (or eNodeB) to the wireless mobile device (or UE), and the uplink transmission can be a communication from the wireless mobile device to the transmission station.

The transmission station and the wireless mobile device can communicate via time-division duplexing (TDD) or frequency-division duplexing (FDD). TDD is an application of time-division multiplexing (TDM) to separate downlink and uplink signals in a time domain. In TDD, downlink signals and uplink signals may be carried on the same carrier frequency where the downlink signals use a different time interval from the uplink signals, so the downlink signals and the uplink signals do not generate interference for each other. In FDD, a transmitter and a receiver to operate using different carrier frequencies. In FDD, interference between downlink and uplink signals is avoided because the downlink signal uses a different carrier frequency from the uplink signals. In LTE, a frame structure type 2 can be used for TDD, and a frame structure type 1 can be applied to both full duplex and half duplex FDD.

Multiple transmission stations may be relatively close in proximity to each other to provide full wireless coverage to mobile devices. Inter-cell interference coordination (ICIC) or enhanced ICIC (eICIC) may be used for resource coordination to reduce interference between the transmission stations (or nodes). At any instant in time, an interfering node (or an aggressor node or transmitting node) may generate interference for a victim node (or receiving node) or victim mobile device (or receiving device).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
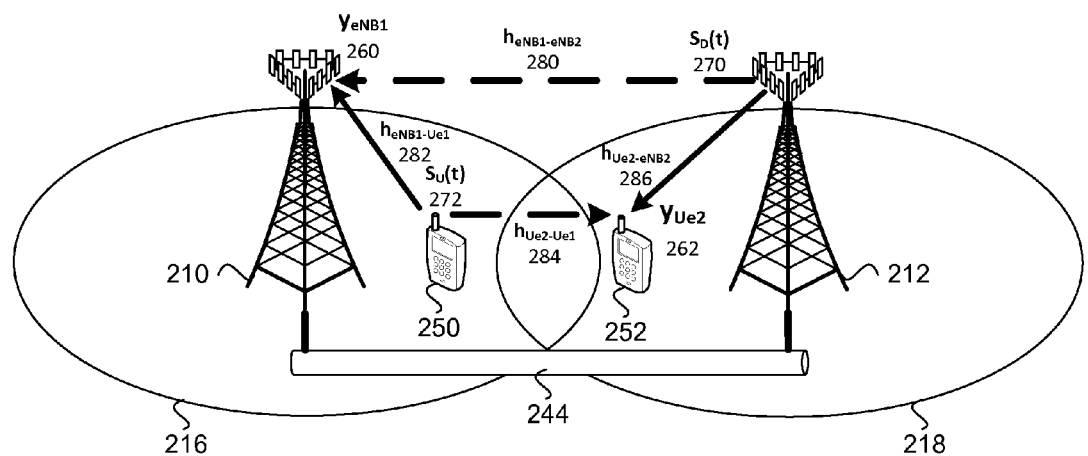
FIG. 1 illustrates a block diagram of an aggressor node transmitting a downlink signal, a wireless device transmitting an uplink signal, and a victim node in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Broadband time-division duplexing (TDD) systems are used in wireless communication for mobile devices throughout world. Chipsets operating in LTE/WiMAX broadband access technologies may support both frequency-division duplexing (FDD) and TDD duplexing modes on a same chip. TDD systems can have certain advantages over FDD systems. For example, in TDD, the channel reciprocity can be effectively used at the physical layer to optimize network performance. TDD systems can also have a high potential for flexibility to traffic conditions relative to FDD systems. In LTE, the efficiency of TDD networks can be substantially improved by eliminating eNodeB to eNodeB inter-cell interference and adapting TDD networks to dynamic traffic conditions.

In practical networks the traffic can be asymmetrical in a time domain or a cell domain. The amount of downlink (DL) and uplink (UL) traffic may be significantly different and may vary in time or across different cells or nodes. The TDD systems have the possibility to effectively handle such traffic variation by adapting the amount of time resources assigned to DL and UL (e.g., different TDD frame configurations). However, such adaptation in multi-cell environment may lead to the emergence of different types of inter-cell interference compared to non-adaptive systems or aligned DL and UL configurations across the multi-cell environment.

FIG. 1 illustrates an example of inter-node interference 280 (including inter-cell interference) between transmission stations 210 and 212 (e.g., eNodeB-to-eNodeB interference) and inter-user interference 284 between users or mobile devices 250 and 252 (e.g., UE-to-UE interference) for a homogeneous network deployment scenario. The different types of interference, including inter-cell interference and inter-user interference, if not account for, may limit the potential benefits of adapting TDD systems to dynamic traffic conditions. Due to the relatively high transmission power of the transmission stations, inter-cell interference (e.g., transmission station-to-transmission station interference or eNodeB-to-eNodeB interference) can be a severe problem. For example, the propagation characteristics between nodes (e.g., macro nodes) can be line-of-sight (LOS) with a transmit power approximately 25-30 decibels (dB) higher than the power of a user terminal or a mobile device. The decibel (dB) is a logarithmic unit that indicates the ratio of a physical quantity (usually power or intensity) relative to a specified or implied reference level. Thus, the power level of a received uplink signal 272 from the mobile device 250 can be less than the power of the inter-node interference signal 270 from the aggressor node. Synchronous TDD networks using the same synchronous TDD configuration over the whole network has been used to avoid inter-node interference.

Inter-node interference can be compensated for or cancelled at a receiving node (e.g., victim node or an uplink node) allowing for asymmetrical DL and UL configurations across the multi-cell environment with reduced interference and greater efficiency of TDD networks. A transmission station (e.g., node) can be both a victim node or an aggressor node based on the DL or UL configuration of the node at a specified time interval. For example, if at one time interval, the node 210 is receiving an uplink (UL) transmission from a mobile device 250 while another node 212 is transmitting a downlink (DL) transmission, the node can be referred to as a victim node or an uplink node. If at another time interval, the node 212 is transmitting a DL transmission to a mobile device 252 while another node 210 is receiving an UL transmission, the node can be referred to as an aggressor node or a downlink node.

In an example, the victim node 210 can receive DL signal information from an aggressor node 212 via a backhaul communication link 244, such as X2 signaling via a wired connection or an optical fiber connection. At the victim node, a channel impulse response 280 for a channel between the aggressor node and the victim node can be estimated using the downlink signal information. An inter-node interference signal for the channel can be estimated using the downlink signal information and the channel impulse response. The victim node can receive an uplink signal 260 from a wireless device 250 after the downlink signal information of the aggressor node is received and the inter-node interference signal is estimated. The estimated inter-node interference signal can be subtracted from the uplink signal to form an inter-node interference compensated uplink signal, which can substantially cancel the inter-node interference from the aggressor node in the uplink signal thus allowing a reliable and high throughput transmission between the victim node and wireless device.

Although, FIG. 1 illustrates a homogeneous network, the methods, systems, devices, and interference described herein can also be applicable to heterogeneous networks. In homogeneous networks, the transmission station, also called macro nodes, can provide basic wireless coverage to mobile devices in a cell. Heterogeneous networks (HetNets) are used to handle the increased traffic loads on the macro nodes due to increased usage and functionality of mobile devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and improve indoor coverage where building structures impede signal transmission.

Figure 2:
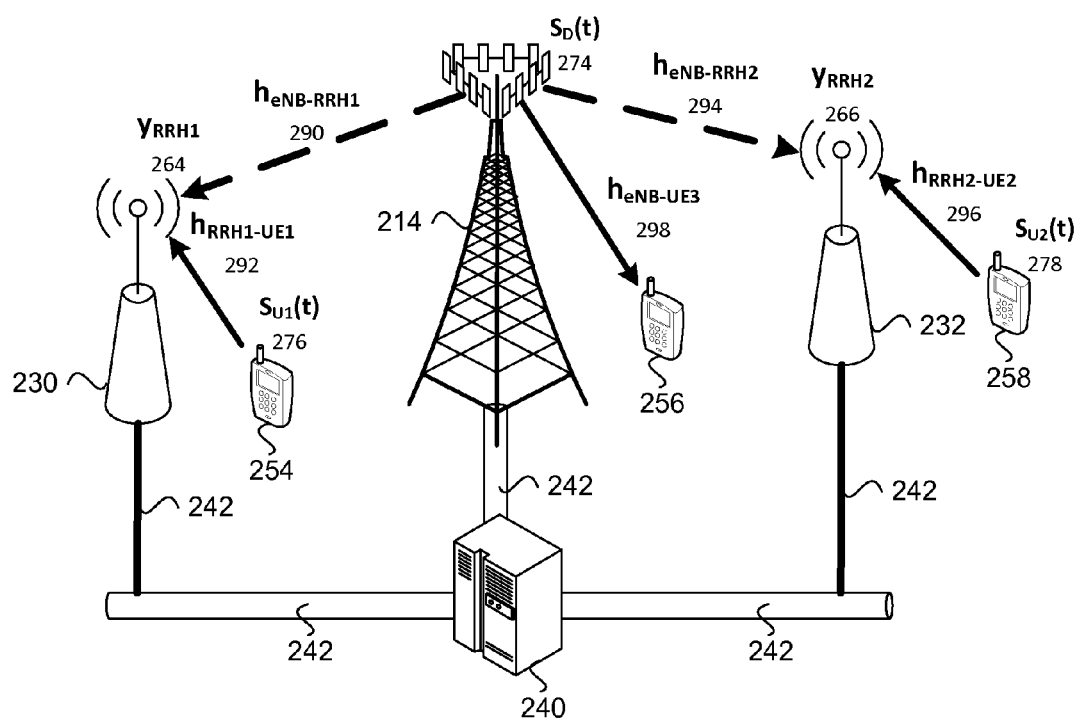
FIG. 2 illustrates a block diagram of a downlink node transmitting a downlink signal, a wireless device transmitting an uplink signal, and an uplink node in a heterogeneous network (HetNet) in accordance with an example.

In another example, such as in a centralized radio access network (C-RAN) or a HetNet, inter-node interference cancellation can be provided by at a central processing module (CPM). In an example the CPM can be used as a baseband unit (BBU) for multiple stations of the network. FIG. 2 illustrates a CPM 240 in communication with a macro node 214 and low power nodes (LPNs) 230 and 232 via a backhaul communication link 242, such as X2 signaling (or other vendor specific connections and protocols) via a wired connection or an optical fiber connection. The CPM can generate a downlink signal for a downlink node 214. The CPM can estimate a channel impulse response 290 for a channel between the downlink node and an uplink node 230 using the downlink signal transmitted by the downlink node. The CPM can determine an inter-node interference signal for the channel using the downlink signal and the channel impulse response. The downlink signal 274 can be transmitted via the downlink node. The CPM can receive an uplink signal 264 from a wireless device via the uplink node at a substantially same time as the downlink signal is transmitted. The received inter-node interference signal can be subtracted from the uplink signal to form an inter-node interference compensated uplink signal to substantially cancel the inter-node interference from the downlink node in the uplink signal.

Inter-node interference cancellation can provide a mechanism to cancel, reduce, or possibly even eliminate inter-node interference in TDD networks for dynamic non-aligned DL/UL frame configurations between nodes or cells. Additionally, inter-node interference cancellation can be used to provide coexistence of TDD and FDD networks.

The following provides additional details of the examples. Inter-node interference (including eNodeB-to-eNodeB inter-node interference for LTE systems) cancellation in TDD networks can be based on the exchange of DL signal information, including DL signal waveforms or their parameters between neighboring nodes (e.g., neighboring transmission stations), and exploiting the DL signal information to cancel the interference on a useful UL signal received by the node. Inter-node interference cancellation can increase the performance of TDD networks when DL and UL traffic asymmetry exists by enabling efficient usage of asynchronous DL/UL frame configurations in different cells (e.g., at different nodes). Inter-node interference cancellation can utilize backhaul link capacity improvements and network architectures relying on the deployment of distributed antenna systems or remote radio heads (RRH), which can be directly connected with a centralized processing unit or module by fiber cables, such as BBU in a C-RAN. The method, devices, and systems described can provide simple and effective inter-cell interference cancellation in TDD networks with dynamic avocation of DL and UL resources in each cell.

A wire-line network infrastructure, such as high-throughput fiber connectivity, has transformed and improved broadband cellular systems architecture. The wire-line network infrastructure facilitates communication in the HetNet infrastructure where serving stations of the network can cooperate with each other to better serve user demands. For example, the macro node 214 can cooperate with several LPNs 230 and 232 deployed within a macro node's coverage or with other neighboring macro nodes. The real time cooperation between networks becomes feasible due to high capacity of backhaul links connecting the serving stations. The usage of remote radio heads and distributed antenna systems in a C-RAN can utilize benefits of geographically distributed data transmissions, and thus increase a network's spectral efficiency. Each remote radio head may be considered as a different cell, if assigned different physical cell ID within a macro cell, or as a remote antenna of a same macro cell. Improvements in the backhaul communication link and C-RAN architecture allow for the deployment of TDD networks supporting dynamic reconfiguration of the proportion of available DL and UL resources, and thus enable further increase the efficiency of TDD networks by adapting to instantaneous traffic conditions in DL and UL directions.

Referring back to FIG. 1 of a homogeneous network deployment operating in dynamic TDD mode at a specified time interval, a victim node 210 in a victim node cell area 216 can be in proximity to an aggressor node 212 in an aggressor node cell area 218. Inter-node interference cancellation can be provided for the victim node operating in UL (victim cell) and the aggressor node operating in DL (aggressor cell). The uplink signal received 260 by the victim node can be represented by $y_{eNB_1}(t) = h_{eNB_1-UE_1} \otimes S_U(t) + h_{eNB_1-eNB_2} \otimes S_D(t) + n(t)$, where $S_U(t)$ 272 is an uplink signal transmitted by a victim cell mobile device (i.e., a wireless device) 250 to the victim node, $S_D(t)$ 270 is a downlink signal transmitted by the aggressor node to an aggressor cell mobile device (i.e., a second wireless device) 252, n(t) is additive noise from other sources, $h_{eNB_1-UE_1}$ 282 is a channel impulse response between the victim cell mobile device and the victim node, $h_{eNB_1-eNB_2}$ 280 is a channel impulse response between the aggressor node and the victim node. FIG. 1 also illustrates a downlink signal received 262 by the aggressor cell mobile device, including the downlink signal with the channel impulse response 286 between the aggressor cell mobile device and the aggressor node, and the uplink signal acting as interference with the channel impulse response 284 between the victim cell mobile device and the aggressor cell mobile device.

Without interference, the uplink signal received can be represented by $h_{eNB_1-UE_1} \otimes S_U(t)$, the linear convolution of the channel impulse response between the victim cell mobile device and the victim node combined with the uplink signal transmitted by a victim cell mobile device. Removing the additive term $h_{eNB_1-eNB_2} \otimes S_D(t)$ of the inter-node interference signal from a neighboring node (e.g., aggressor node) can allow the victim node to successfully receive the uplink signal $S_U(t)$ in some scenarios. The power of the interference signal $h_{eNB_1-eNB_2} \otimes S_D(t)$ generated by the aggressor node can be much higher than the power of the useful uplink signal $h_{eNB_1-UE_1} \otimes S_U(t)$.

The interfering node (i.e., aggressor node) 212 can provide over the backhaul link 244 the downlink signal information on the transmitted signal 270 to the receiving node (i.e., victim node) 210. Both the interfering node and the receiving node can receive the downlink signal information from each other since, both nodes can provide downlink transmission at different intervals of time. The downlink signal information exchange may be implemented in different ways. In one embodiment, the downlink signal information may include a direct waveform $S_D(t)$ 270. In another embodiment, the downlink signal information may include the specific information used to reconstruct the transmitted waveform $S_D(t)$ at the victim node. Such specific information may include information bits, a resource allocation, a multiple input multiple output (MIMO) transmission mode, a modulation and code rate, and combination of this specific information. The signal transmitted by aggressor node can become fully or partially known and available at the victim node.

Once the transmitted inter-cell interference waveform $S_D(t)$ 270 is available at the victim node 210, the victim node may use the inter-cell interference waveform to estimate the channel impulse response $h_{eNB_1-eNB_2}$ 280 or channel transfer function between the victim node and the aggressor node. The channel estimation accuracy of the channel impulse response can be very high due to a large processing gain which comes from a knowledge of the transmitted waveform $S_D(t)$. Alternatively, channel estimation may be performed with addition information provided by reference signals (RS) or synchronization signals in the system, or the channel estimate may be provided by the network when the channel estimate was previously measured.

The victim node 210 can estimate or reconstruct the received inter-cell interference signal $h_{eNB_1-eNB_2} \otimes S_D(t)$ and subtract the inter-cell interference signal from the received signal $y_{eNB_1}(t)$ 260, thus suppressing the inter-cell interference. When the inter-cell interference channel estimation can be accurately estimated, the inter-node interference compensated uplink signal at the victim node $x_{eNB_1}(t)$ may be represented by $x_{eNB_1}(t) = y_{eNB_1}(t) - h_{eNB_1-eNB_2} \otimes S_D(t) = h_{eNB_1-UE_1} \otimes S_U(t) + n(t)$, which can substantially cancel the inter-node interference from the aggressor node in the uplink signal.

Thus, inter-node interference cancellation can remove most of the inter-node interference, which can make the reception of the uplink signal feasible in an asymmetric UL-DL configuration between neighboring nodes. Inter-node interference cancellation can provide the TDD networks an additional option to dynamically control the TDD configuration in each cell of the network based on the instantaneous DL and UL traffic asymmetry.

Figure 3:
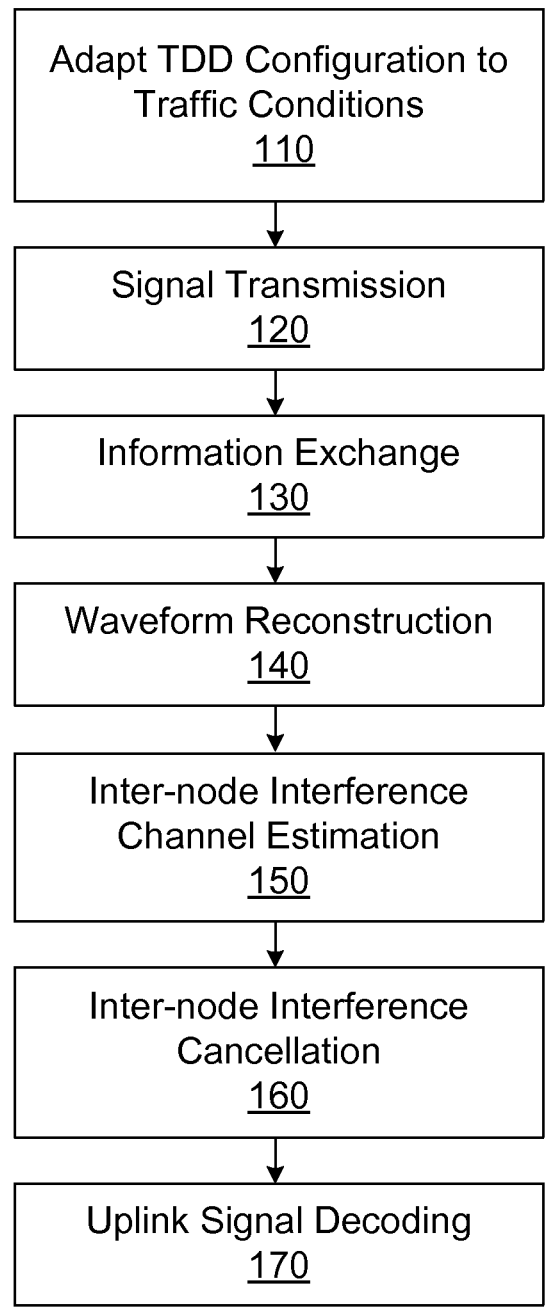
FIG. 3 illustrates a flow chart of inter-node interference cancellation in accordance with an example.

FIG. 3 illustrates an example method to cancel, reduce, or eliminate the inter-node interference from an aggressor node in networks with dynamic TDD configurations. Each cell or node of a TDD network can adjust the TDD configuration for the node to better fit DL and UL traffic conditions, or each node can provide an adaptation of TDD configuration to traffic conditions 110. The victim cells or victim nodes can operate in an UL and aggressor cells or aggressor nodes can transmit DL signal to aggressor cell users or mobile devices, or aggressor nodes and victim cell mobile devices can provide a signal transmission 120. The aggressor cells or aggressor nodes can provide downlink signal information to victim cells or victim nodes sufficient to recover signals transmitted by aggressor cells or aggressor nodes, or the nodes can provide an information exchange 130 of the downlink signal information. The victim cells or victim nodes can reconstruct DL waveforms transmitted by aggressor cells or aggressor nodes, or the victim nodes can provide waveform reconstruction 140 of the downlink signal. The victim cells or victim nodes can estimate the channel from aggressor cells using the reconstructed DL waveforms, or the victim nodes can provide inter-node interference channel estimation 150. The victim cells or victim nodes can use the reconstructed waveforms and channel estimates to create a copy of the inter-node interference signal and subtract the copy from the received signal, or the victim nodes can provide inter-node interference cancellation 160. The victim cell or victim node can perform processing to decode uplink signal, or the victim nodes can provide uplink signal decoding 170.

Inter-node interference cancellation can be used in HetNets or a centralized, cooperative, or cloud radio access network (C-RAN), where the transmission station (or node) functionality can be subdivided between a baseband unit (BBU) processing pool and a remote radio unit (RRU) or a remote radio head (RRH) with optical fiber connecting the BBU to the RRU. The C-RAN can provide centralized processing, co-operative radio, and real-time cloud infrastructure RAN.

Figure 4:
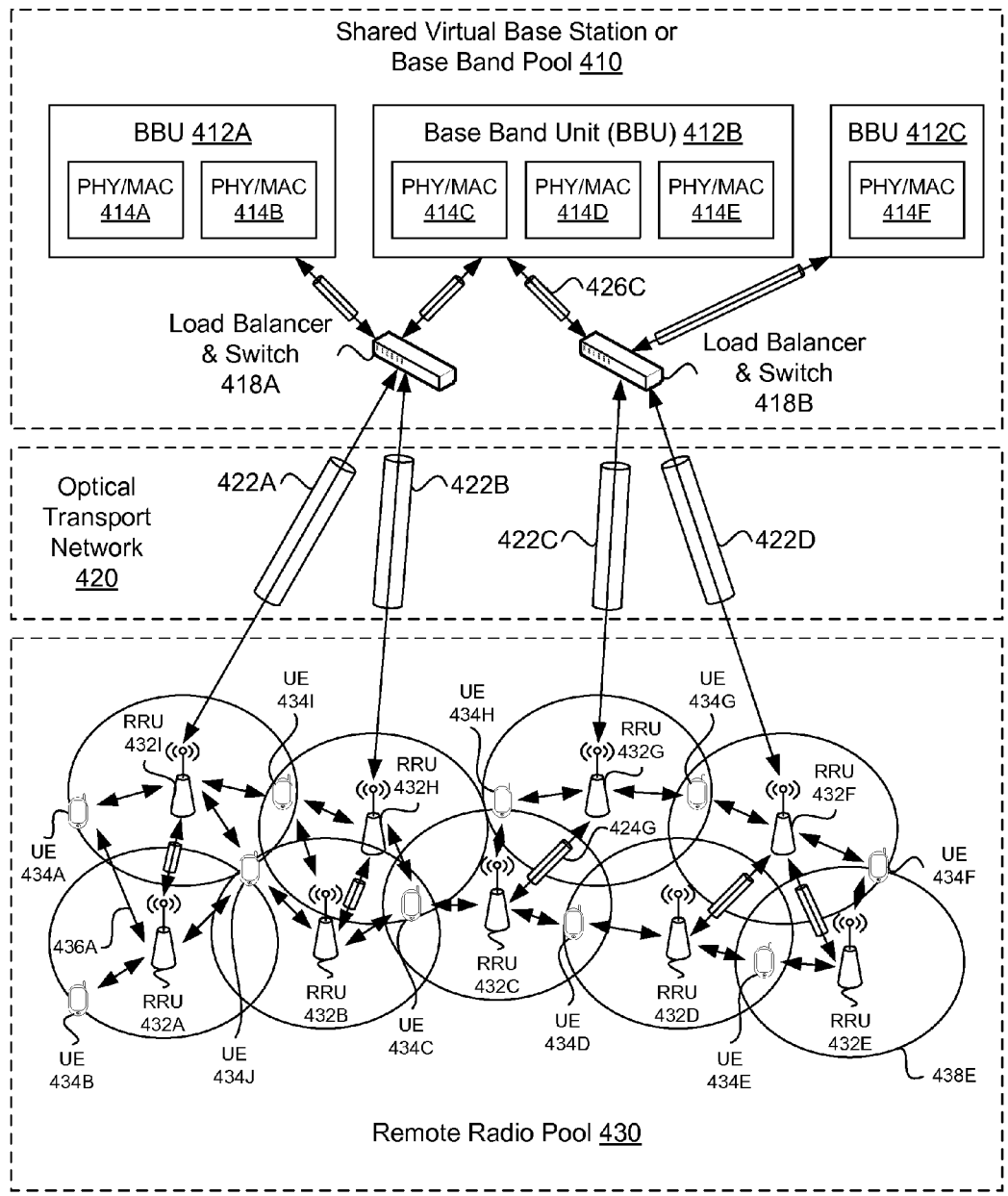
FIG. 4 illustrates a block diagram of a baseband unit (BBU) and a remote radio unit (RRU) configuration of a centralized radio access network (C-RAN) in accordance with an example.

As illustrated in FIG. 4, the C-RAN can be composed of three parts: a remote radio pool 430 equipped by remote radio units (RRUs) 432A-I with antennas, a shared virtual base station or a baseband processing pool 410 including baseband units (BBUs) 412A-C, and a fiber or cable 422A-D and 424G in a physical transport network 420 connecting at least one of the RRUs in the remote radio pool to at least one of the BBUs in the baseband pool. The baseband processing pool can be centralized. Each BBU can include a high-performance general purpose processor, a real-time virtualization processor, and/or a physical (PHY) layer processor and/or a MAC layer processor 414A-F. The BBUs can be coupled to a load balancer and switch 418A-B via electrical or optical cabling 426C. The physical transport network can be a low-latency transport network, a bandwidth-efficient network, and/or an optical transport network 420 using optical fiber or optical cabling.

In another example, the physical transport network can be a high speed electrical transport network. The physical transport network can provide a physical communication link between the BBU and the RRU. The physical communication link can include an optical fiber link or a wired electrical link. The BBU can be referred to as a radio element controller (REC). The RRU can be referred to as a remote radio head (RRH), a remote radio equipment (RRE), a relay station (RS), or a radio equipment (RE). Each RRU can be separated from the BBU by a selected distance. Each RRU can include a sector, cell, or coverage area 438E for a mobile device, such as a user equipment (UE) 434A-J, where the mobile device may be located within multiple sectors, cells, or coverage areas. The distributed RRUs of the C-RAN can provide a RAN with high capacity and a wide coverage area.

RRUs 432A-I can be smaller, easier to install, easier to maintain, and consume less power than the BBUs 412A-C. The baseband processing pod 110 can aggregate the processing power of the BBU through real-time virtualization technology and provide the signal processing capacity to the virtual BTSs or RRUs in the pool. The physical transport network can distribute the processed signals to the RRUs in the remote radio pod 430. The centralized BBU pod can reduce the number of transmission station rooms used for BBUs and can make resource aggregation and large-scale cooperative radio transmission/reception possible. The C-RAN can dynamically switch a serving gateway's (S-GW) connectivity from a first BBU to a second BBU in the BBU pool. In another example, the C-RAN can dynamically switch a BBU's connectivity from a first RRU to a second RRU in the RRU pool.

Referring back to FIG. 2, a heterogeneous network deployment operating in dynamic TDD mode at a specified time interval can provide the inter-node interference cancellation in HetNets and/or a C-RAN. Inter-node interference cancellation can apply to nodes in a heterogeneous cooperative network with a central processing module (CPM) or centralized processing unit and remote radio heads (or macro node or LPNs). When the CPM is used, a backhaul link for transmitting downlink signal information to an uplink node may not be needed and processing, such as construction of a transmit waveform, inter-node channel estimation, and subtraction of the inter-node interference signal from the received uplink signal, may be directly implemented at the CPM, which may also control operation of several cells, nodes, or remote radio heads (RRH).

FIG. 2 illustrates a CPM 240 in communication with a macro node 214 and low power nodes (LPNs) 230 and 232 via a backhaul communication link 242, such as X2 signaling via a wired connection or an optical fiber connection. The CPM can generate a downlink signal for a downlink node 214. The CPM can estimate a channel impulse response 290 for a channel between the downlink node and an uplink node 230 using the downlink signal or downlink signal information. The CPM can determine an inter-node interference signal for the channel using the downlink signal and the channel impulse response. The downlink signal 274 can be transmitted via the downlink node. The CPM can receive an uplink signal 264 from a wireless device via the uplink node at a substantially same time as the downlink signal is transmitted. The received inter-node interference signal can be subtracted from the uplink signal to form an inter-node interference compensated uplink signal to substantially cancel the inter-node interference from the downlink node in the uplink signal.

Inter-node interference cancellation can be provided for the uplink node 230 or 232 operating in an UL in proximity to downlink node 214 operating in a DL. The uplink signal received 264 by the uplink node 230 can be represented by $y_{RRH_1}(t) = h_{RRH_1-UE_1} \otimes S_{U_1}(t) + h_{eNB-RRH_2} \otimes S_D(t) + n(t)$, where $S_{U_1}(t)$ 276 is an uplink signal transmitted by a mobile device (i.e., a wireless device) 254 to the uplink node, $S_D(t)$ 274 is a downlink signal transmitted by the downlink node 214 to a second mobile device (i.e., a second wireless device) 256, n(t) is additive noise from other sources, $h_{RRH_1-UE_1}$ 292 is a channel impulse response between the mobile device and the uplink node, $h_{eNB-RRH_2}$ 290 is a channel impulse response between the downlink node and the uplink node.

FIG. 2 also illustrates a second uplink signal received $y_{RRH_2}(t)$ 266 by a second uplink node 232, where $S_{U_2}(t)$ 278 is an second uplink signal transmitted by a third mobile device 258 to the second uplink node, $h_{RRH_2-UE_2}$ 296 is a channel impulse response between the third mobile device and the second uplink node, and $h_{eNB-RHH_2}$ 294 is a channel impulse response between the downlink node and the second uplink node. FIG. 2 also illustrates a downlink signal received by the second mobile device, including the downlink signal with the channel impulse response $h_{eNB-UE_1}$ 298 between the second mobile device and the downlink node.

Inter-node interference cancellation can be used in combination with MIMO beamforming techniques. For example, the transmit beamforming at the aggressor node or downlink node can provide null steering in the direction of the victim node or uplink node to minimize the signal transmission power emitted in the direction of the victim node or uplink node. Receiver (RX) beamforming and interference cancellation at the side of the victim node or uplink node can provide preliminary inter-cell interference compensation caused by the aggressor node or downlink node.

In another example, inter-cell interference cancellation can be applied to asynchronous DL and UL transmissions in different cells by using a reference interference signal waveform exchanged through the backhauling link between neighboring nodes. Inter-cell interference cancellation can include reconstruction of the DL signal waveforms from aggressor cells and/or adaptation to DL and UL traffic asymmetry in TDD networks.

Figure 5:
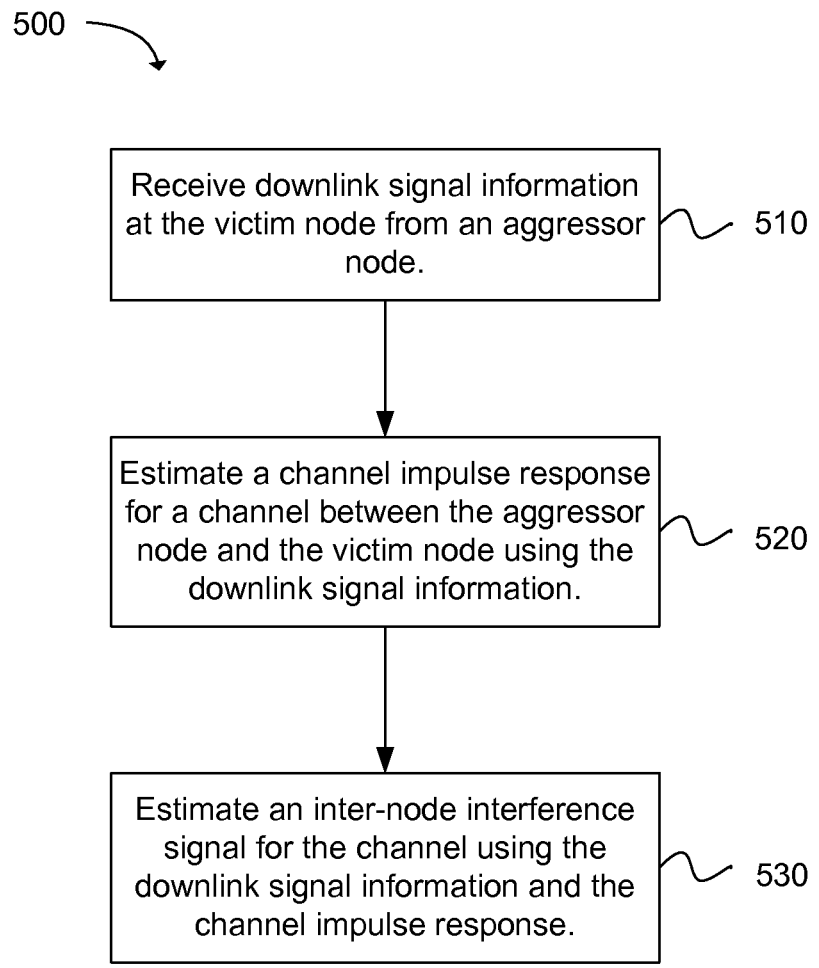
FIG. 5 depicts a flow chart, of a method for cancelling inter-node interference at a victim node in accordance with an example.

Another example provides a method 500 for cancelling inter-node interference at a victim node, as shown in the flow chart in FIG. 5. The method may be executed as instructions on a machine, where the instructions are included on at least one computer readable medium. The method includes the operation of receiving downlink signal information at the victim node from an aggressor node, as in block 510. The operation of estimating a channel impulse response for a channel between the aggressor node and the victim node using the downlink signal information follows, as in block 520. The next operation of the method can be estimating an inter-node interference signal for the channel using the downlink signal information and the channel impulse response, as in block 530.

The method can further include receiving an uplink signal from a wireless device, wherein the downlink signal information is received prior to the reception of the uplink signal. The operation of subtracting the estimated inter-node interference signal from the uplink signal to form an inter-node interference compensated uplink signal to substantially cancel the inter-node interference from the aggressor node in the uplink signal can follow. The wireless device can be a mobile device, a user equipment (UE), or a mobile station (MS).

The uplink signal $y_{eNB_1}(t)$ received by the victim node can be represented by $y_{eNB_1}(t) = h_{eNB_1-UE_1} \otimes S_U(t) + h_{eNB_1-eNB_2} \otimes S_D(t) + n(t)$, where $\otimes$ is an operator defining a linear convolution, $S_U(t)$ is an uplink signal transmitted by the wireless device to the victim node in the victim cell, $S_D(t)$ is the downlink signal transmitted by the aggressor node to a second wireless device, n(t) is additive noise, $h_{eNB_1-UE_1}$ is the channel impulse response between the wireless device and the victim node, and $h_{eNB_1-eNB_2}$ is a channel impulse response between the aggressor node and the victim node, wherein the inter-node interference signal is represented by $h_{eNB_1-eNB_2} \otimes S_D(t)$, and the inter-node interference compensated uplink signal $x_{eNB_1}(t)$ is represented by $x_{eNB_1}(t) = y_{eNB_1}(t) - h_{eNB_1-eNB_2} \otimes S_D(t) = h_{eNB_1-UE_1} \otimes S_U(t) + n(t)$.

The method can further include decoding the inter-node interference compensated uplink signal for uplink signal information transmitted by the wireless device. The downlink signal information is received via X2 signaling or backhaul link signaling via a wired connection or an optical fiber connection. Estimating the channel impulse response can further include receiving a reference signal from the aggressor node, and estimating the channel impulse response using the reference signal. The downlink signal information can be a direct signal waveform, can include control and payload information sufficient to reconstruct a downlink signal waveform, or can include specific information for reconstructing the downlink waveform. The victim node and the aggressor node can include an evolved Node B (eNodeB), a base station (BS), a macro evolved Node B (macro-eNB), a low power node (LPN), a micro-eNB, a pico-eNB, a femto-eNB, a home eNB (HeNB), a remote radio head (RRH), a remote radio equipment (RRE), or a remote radio unit (RRU).

Figure 6:
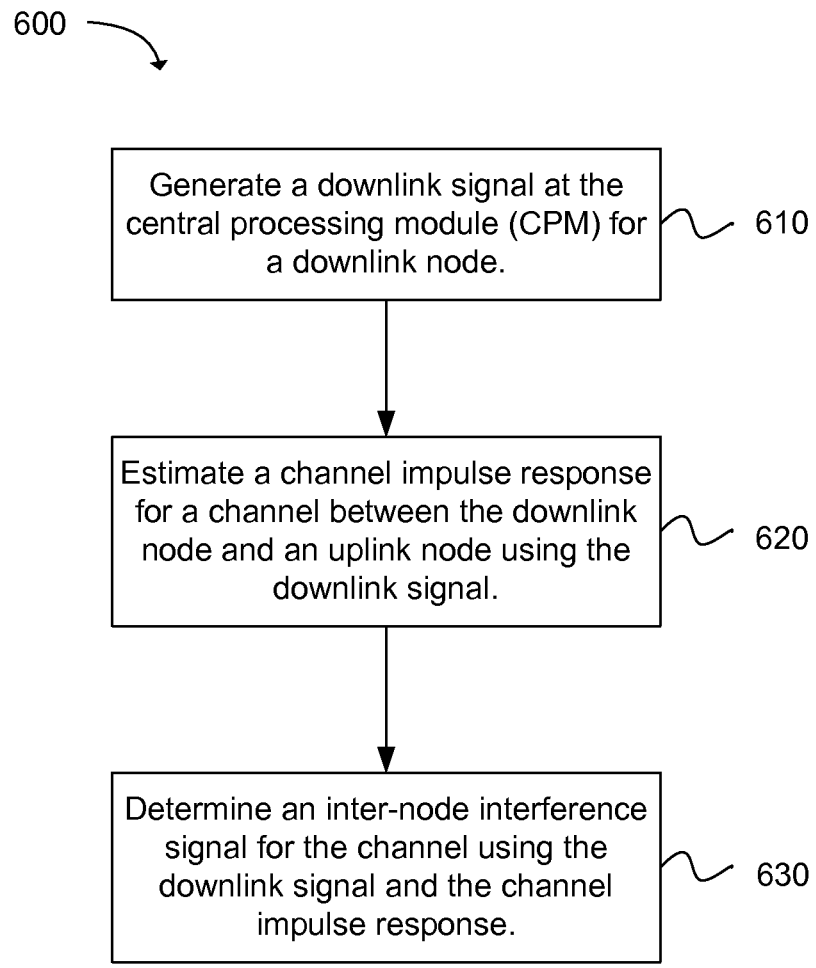
FIG. 6 depicts a flow chart of a method for cancelling inter-node interference at a central processing module (CPM) in accordance with an example.

Another example provides a method 600 for cancelling inter-node interference at a central processing module (CPM), as shown in the flow chart in FIG. 6. The method may be executed as instructions on a machine, where the instructions are included on at least one computer readable medium. The method includes the operation of generating a downlink signal at the CPM for a downlink node, as in block 610. The operation of estimating a channel impulse response for a channel between the downlink node and an uplink node using the downlink signal follows, as in block 620. The next operation of the method can be determining an inter-node interference signal for the channel using the downlink signal and the channel impulse response, as in block 630.

The method can further include transmitting the downlink signal via the downlink node. The operation of receiving an uplink signal at the CPM from a wireless device via the uplink node at a substantially same time as the downlink signal is transmitted can follow. The next operation of the method can be subtracting the received inter-node interference signal from the uplink signal to form an inter-node interference compensated uplink signal to substantially cancel the inter-node interference from the downlink node in the uplink signal.

The uplink signal $y_{RHH_1}(t)$ received by the uplink node is represented by $y_{RHH_1}(t) = h_{RRH_1-UE_1} \otimes S_{U_1}(t) + h_{eNB-RRH_2} \otimes S_D(t) + n(t)$, where $\otimes$ is an operator defining a linear convolution, $s_{U_1}(t)$ is an uplink signal transmitted by the wireless device to the uplink node, $S_D(t)$ is the downlink signal transmitted by the downlink node to a second wireless device, n(t) is additive noise, $h_{RRH_1-UE_1}$ is a channel impulse response between the wireless device and the uplink node, and $h_{eNB-RRH_2}$ is a channel impulse response between the downlink node and the uplink node, wherein the inter-node interference signal is represented by $h_{eNB-RRH_2} \otimes S_D(t)$, and the inter-node interference compensated uplink signal $x_{RRH_1}(t)$ is represented by $x_{RRH_1}(t) = y_{RHH_1}(t) - h_{eNB-RRH_2} \otimes S_D(t) = h_{RRH_1-UE_1} \otimes S_{U_1}(t) + n(t)$. The method can further include decoding the inter-node interference compensated uplink signal for uplink signal information transmitted by the wireless device. The downlink signal is transmitted to the downlink node and the uplink signal is received from the uplink node via X2 signaling or backhaul link signaling via a wired connection or an optical fiber connection. The method can further include rescheduling uplink (UL) and downlink (DL) frames or change UL-DL configuration to reduce the number of asynchronous DL/UL subframes in frames between the uplink node and the downlink node. The CPM can include an evolved Node B (eNodeB), a base station (BS), a macro evolved Node B (macro-eNB), or a baseband unit (BBU). The downlink node and uplink node can include an evolved Node B (eNodeB), a base station (BS), a macro evolved Node B (macro-eNB), a low power node (LPN), a micro-eNB, a pico-eNB, a femto-eNB, a home eNB (HeNB), a remote radio head (RRH), a remote radio equipment (RRE), or a remote radio unit (RRU).

Figure 7:
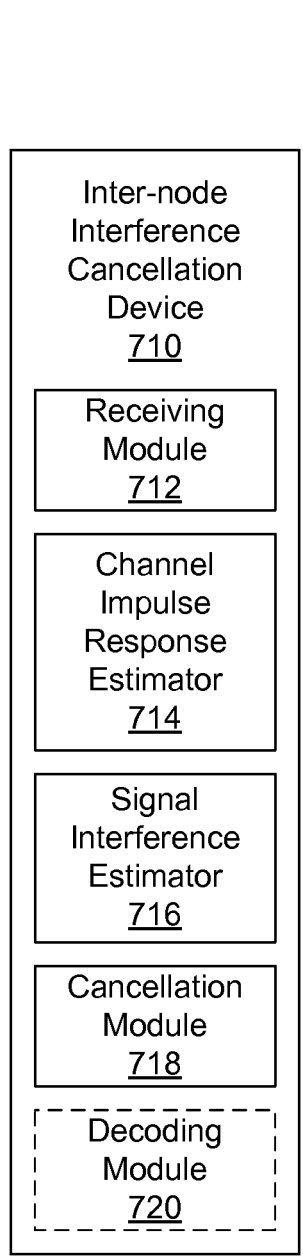
FIG. 7 illustrates a block diagram of a inter-node interference cancellation device in accordance with an example.

FIG. 7 illustrates an example inter-node interference cancellation device 710. The inter-node interference cancellation device can be included in a node, which can include an evolved Node B (eNodeB), a base station (BS), a macro evolved Node B (macro-eNB), a low power node (LPN), a micro-eNB, a pica-eNB, a femto-eNB, a home eNB (HeNB), a baseband unit (BBU), a remote radio head (RRH), a remote radio equipment (RRE), a remote radio unit (RRU). The inter-node interference cancellation device can include a receiving module 712, a channel impulse response estimator 714, a signal interference estimator 716, and a cancellation module 718. The inter-node interference cancellation device may also include a decoding module 720, a transmitting module (not shown), or a scheduling module (not shown). The receiving module can be configured to receive downlink signal information at a node from a neighboring node. The channel impulse response estimator can be configured to estimate a channel impulse response for a channel between the neighboring node and the node using the downlink signal information. The signal interference estimator can be configured to estimate an inter-node interference signal for the channel using the downlink signal information and the channel impulse response. The cancellation module can be configured to subtract the estimated inter-node interference signal from an uplink signal to form an inter-node interference compensated uplink signal to substantially cancel the inter-node interference from the neighboring node in the uplink signal. The receiving module can be further configured to receive the uplink signal from a wireless device before subtracting the estimated inter-node interference signal from the uplink signal. The downlink signal information can be received prior to the reception of the uplink signal. The transmitting module can be configured to transmit downlink signal information for the node to a neighboring node and transmit a downlink signal to a second wireless device.

The uplink signal $y_{eNB_1}(t)$ received by the inter-node interference cancellation device can be represented by $y_{eNB_1}(t) = h_{eNB_1-UE_1} \otimes S_U(t) + h_{eNB_1-eNB_2} \otimes S_D(t) + n(t)$, where $\otimes$ is an operator defining a linear convolution, $S_U(t)$ is an uplink signal transmitted by the wireless device to the node, $S_D(t)$ is the downlink signal transmitted by the neighboring node to a second wireless device, n(t) is additive noise, $h_{eNB_1-UE_1}$ is the channel impulse response between the wireless device and the node, and $h_{eNB_1-eNB_2}$ is a channel impulse response between the neighboring node and the node, wherein the inter-node interference signal is represented by $h_{eNB_1-eNB_2} \otimes S_D(t)$, and the inter-node interference compensated uplink signal $x_{eNB_1}(t)$ is represented by $x_{eNB_1}(t) = y_{eNB_1}(t) - h_{eNB_1-eNB_2} \otimes S_D(t) = h_{eNB_1-UE_1} \otimes S_U(t) + n(t)$.

The decoding module can be configured to decode the inter-node interference compensated uplink signal for uplink signal information transmitted by the wireless device. The transmitting module can be configured to transmit a downlink signal with null steering in the direction of a neighboring node having an asynchronous downlink/uplink (DL/UL) frame configuration with the node. The receiving module can be further configured to receive the downlink signal information via X2 signaling or backhaul link signaling via a wired connection or an optical fiber connection. The scheduling module can be configured to reschedule uplink (UL) and downlink (DL) frames or change UL-DL configuration to reduce the number of asynchronous DL/UL subframes in frames between the node and a neighboring node.

Figure 8:
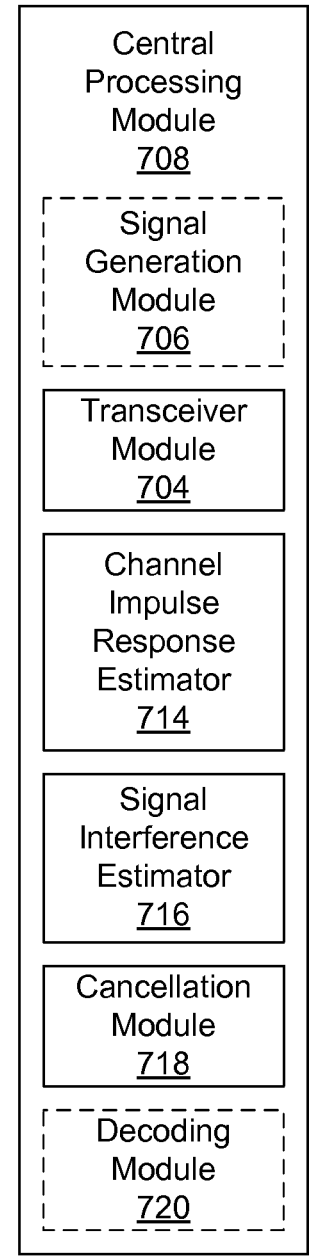
FIG. 8 illustrates a block diagram of a central processing module (CPM) for cancelling inter-node interference in accordance with an example.

FIG. 8 illustrates an example central processing module (CPM) 708. The CPM can be included in a node or transmission station, which can include a baseband unit (BBU), evolved Node B (eNodeB), a base station (BS), a macro evolved Node B (macro-eNB), a low power node (LPN), a micro-eNB, a pico-eNB, a fento-eNB, a home eNB (HeNB), and a base station (BS). The CPM can include a signal generation module 706, a transceiver module 704, a channel impulse response estimator 714, a signal interference estimator 716, and a cancellation module 718. The CPM may also include a decoding module 720 and a scheduling module (not shown). The signal generation module can be configured to generate a downlink signal for a downlink node. The channel impulse response estimator can be configured to estimate a channel impulse response for a channel between the downlink node and an uplink node using the downlink signal information. The signal interference estimator can be configured to estimate an inter-node interference signal for the channel using the downlink signal information and the channel impulse response. The transceiver module can be configured to receive an uplink signal from a wireless device. The cancellation module can be configured to subtract the estimated inter-node interference signal from the uplink signal to form an inter-node interference compensated uplink signal to substantially cancel the inter-node interference from the downlink node in the uplink signal. The transceiver module can be further configured to transmit the downlink signal and receive an uplink signal via X2 signaling or backhaul link signaling via a wired connection or an optical fiber connection.

The uplink signal $y_{RHH_1}(t)$ received by the uplink node is represented by $y_{RHH_1}(t) = h_{RRH_1-UE_1} \otimes S_{U_1}(t) + h_{eNB-RRH_2} \otimes S_D(t) + n(t)$, where $\otimes$ is an operator defining a linear convolution, $S_{U_1}(t)$ is an uplink signal transmitted by the wireless device to the uplink node, $s_D(t)$ is the downlink signal transmitted by the downlink node to a second wireless device, n(t) is additive noise, $h_{RRH_1-UK_1}$ is a channel impulse response between the wireless device and the uplink node, and $h_{eNB-RHH_2}$ is a channel impulse response between the downlink node and the uplink node, wherein the inter-node interference signal is represented by $h_{eNB-RRH_2} \otimes S_D(t)$, and the inter-node interference compensated uplink signal $x_{RHH_1}(t)$ is represented by $x_{RRH_1}(t) = y_{RHH_1}(t) - h_{eNB-RHH_2} \otimes S_D(t) = h_{RRH_1-UE_1} \otimes S_{U_1}(t) + n(t)$.

The decoding module can be configured to decode the inter-node interference compensated uplink signal for uplink signal information transmitted by the wireless device. The transceiver module can be further configured to transmit a downlink signal with null steering in the direction of an uplink node having an asynchronous downlink/uplink (DL/UL) frame configuration with the downlink node. The scheduling module can be configured to reschedule uplink (UL) and downlink (DL) frames or change UL-DL configuration to reduce the number of asynchronous DL/UL subframes in frames between the downlink node and the uplink node.

Figure 9:
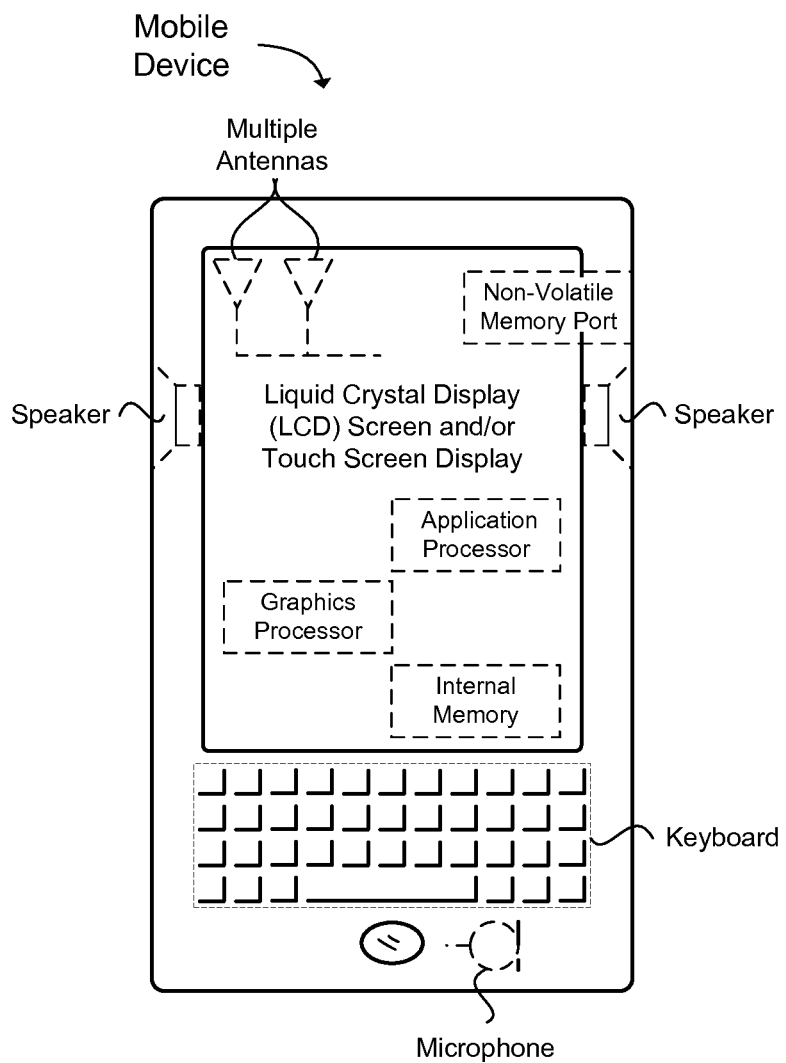
FIG. 9 illustrates a diagram of a mobile device in accordance with an example.

In another example, a transmission station can be in wireless communication with a mobile device. FIG. 9 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a dock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory computer readable medium having instructions stored therein for cancelling inter-node interference at a victim node, the instructions when executed on a machine to cause the machine to:
   receive downlink signal information at the victim node from an aggressor node;
   estimate a channel impulse response for a channel between the aggressor node and the victim node using the downlink signal information;
   estimate an inter-node interference signal for the channel using the downlink signal information and the channel impulse response;
   receive, at the victim node, an uplink signal from a wireless device, wherein the downlink signal information is received prior to the reception of the uplink signal; and
   subtract the estimated inter-node interference signal from the uplink signal to form an inter-node interference compensated uplink signal to substantially cancel inter-node interference caused by the aggressor node in the uplink signal received from the wireless device,
   wherein cancellation of the inter-node interference at the victim node enables the victim node to dynamically control a Time Division Duplexing (TDD) configuration based on downlink and uplink traffic asymmetry without inter-node interference from the aggressor node.

2. The at least one computer readable medium of claim 1, wherein the wireless device is mobile device selected from the group consisting of a user equipment (UE) and a mobile station (MS), and wherein the mobile device includes an antenna, a touch sensitive display screen, a speaker, a microphone, a graphics processor, an application processor, internal memory, a non-volatile memory port, or combinations thereof.

3. The at least one computer readable medium of claim 1, wherein the uplink signal $y_{eNB_1}(t)$ received by the victim node is represented by $y_{eNB_1}(t)=h_{eNB_1\text{-}UE_S}(t)*S_U(t)+h_{eNB_1\text{-}eNB_2}*S_D(t)+n(t)$, where * is an operator defining a linear convolution, $S_U(t)$ is an uplink signal transmitted by the wireless device to the victim node in the victim cell, $S_D(t)$ is the downlink signal transmitted by the aggressor node to a second wireless device, $n(t)$ is additive noise, $h_{eNB_1\text{-}UE_1}$ is the channel impulse response between the wireless device and the victim node, and $h_{eNB_1\text{-}eNB_2}$ is a channel impulse response between the aggressor node and the victim node, wherein the inter-node interference signal is represented by $h_{eNB_1\text{-}eNB_2}*S_D(t)$, and the inter-node interference compensated uplink signal $x_{eNB_1}(t)$ is represented by $x_{eNB_1}(t)=y_{eNB_1}(t)-h_{eNB_1\text{-}eNB_2}*S_D(t)*h_{eNB_1\text{-}UE_1}*S_U(t)+n(t)$.

4. The at least one computer readable medium of claim 1, with further instructions to: decode the inter-node interference compensated uplink signal for uplink signal information transmitted by the wireless device.

5. The at least one computer readable medium of claim 1, wherein the downlink signal information is received via X2 signaling or backhaul link signaling via a wired connection or an optical fiber connection.

6. The at least one computer readable medium of claim 1, wherein the instruction to estimate the channel impulse response includes further instructions to:
   receive a reference signal from the aggressor node; and
   estimate the channel impulse response using the reference signal.

7. The at least one computer readable medium of claim 1, wherein the downlink signal information is a direct signal waveform, includes control and payload information sufficient to reconstruct a downlink signal waveform, or includes specific information for reconstructing the downlink waveform.

8. The at least one computer readable medium of claim 1, wherein the victim node and the aggressor node are selected from the group consisting of an evolved Node B (eNodeB), a base station (BS), a macro evolved Node B (macro-eNB), a low power node (LPN), a micro-eNB, a pico-eNB, a femto-eNB, a home eNB (HeNB), a remote radio head (RRH), a remote radio equipment (RRE), a remote radio unit (RRV), and combinations thereof.

9. An inter-node interference cancellation device, comprising one or more processors and memory configured to:
   receive downlink signal information at a node from a neighboring node;
   estimate a channel impulse response for a channel between the neighboring node and the node using the downlink signal information;
   estimate an inter-node interference signal for the channel using the downlink signal information and the channel impulse response; and
   subtract the estimated inter-node interference signal from an uplink signal to form an inter-node interference compensated uplink signal to substantially cancel inter-node interference caused by the neighboring node in the uplink signal,
   wherein the uplink signal is received from a wireless device before subtracting the estimated inter-node interference signal from the uplink signal, wherein the downlink signal information is received prior to the reception of the uplink signal, wherein cancellation of the inter-node interference at the node enables the node to dynamically control a Time Division Duplexing (TDD) configuration based on downlink and uplink traffic asymmetry without inter-node interference from the neighboring node.

10. The inter-node interference cancellation device of claim 9, further comprising: a transmitting module configured to transmit downlink signal information for the node to a neighboring node and transmit a downlink signal to a second wireless device.

11. The inter-node interference cancellation device of claim 9, wherein the uplink signal $y_{eNB_1}(t)$ received by the inter-node interference cancellation device is represented by $y_{eNB_1}(t)=h_{eNB_1\text{-}UE_1}S_U(t)+h_{eNB_1\text{-}eNB_2}S_D(t)+n(t)$, where * is an operator defining a linear convolution, $S_U(t)$ is an uplink signal transmitted by the wireless device to the node, $S_D(t)$ is the downlink signal transmitted by the neighboring node to a second wireless device, $n(t)$ is additive noise, $h_{eNB_1\text{-}UE_1}$ is the channel impulse response between the wireless device and the node, and $h_{eNB_1\text{-}eNB_2}$ is a channel impulse response between the neighboring node and the node, wherein the inter-node interference signal is represented by $h_{eNB_1\text{-}eNB_2}S_D(t)$, and the inter-node interference compensated uplink signal $x_{eNB_1}(t)$ is represented by $x_{eNB_1}(t)=y_{eNB_1}(t)-h_{eNB_1-eNB_2}S_D(t)h_{eNB_1-UE_1}S_U(t)+n(t)$.

12. The inter-node interference cancellation device of claim 9, further comprising: a decoding module configured to decode the inter-node interference compensated uplink signal for uplink signal information transmitted by the wireless device.

13. The inter-node interference cancellation device of claim 9, further comprising: a transmitting module configured to transmit a downlink signal with null stearing in the direction of a neighboring node having an asynchronous downlink/uplink (DL/UL) frame configuration with the node.

14. The inter-node interference cancellation device of claim 9, wherein the one or more processors and memory are further configured to receive the downlink signal information via X2 signaling or backhaul link signaling via a wired connection or an optical fiber connection.

15. The inter-node interference cancellation device of claim 9, wherein the one or more processors and memory are further configured to:
reschedule uplink (UL) and downlink (DL) frames or change UL-DL configuration to reduce the number of asynchronous DL/UL subframes in frames between the node and a neighboring node.

16. The inter-node interference cancellation device of claim 9, wherein the node is selected from the group consisting of an evolved Node B (eNodeB), a base station (BS), a macro evolved Node B (macro-eNB), a low power node (LPN), a micro-eNB, a pico-eNB, a femto-eNB, a home eNB (HeNB), a baseband unit (BBU), a remote radio head (RRH), a remote radio equipment (RRE), a remote radio unit (RRU), and combinations thereof.

* * * * *